United States Patent
Chong et al.

(10) Patent No.: US 10,341,486 B2
(45) Date of Patent: Jul. 2, 2019

(54) USER CONFIGURABLE SERVICES IN A WIRELESS COMMUNICATION NETWORK

(71) Applicant: T-Mobile USA, Inc., Bellevue, WA (US)

(72) Inventors: Teck-Kong Chong, Bellevue, WA (US); Xavier Ligeret, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/610,116

(22) Filed: May 31, 2017

(65) Prior Publication Data

US 2018/0352080 A1    Dec. 6, 2018

(51) Int. Cl.

| | | |
|---|---|---|
| *H04M 3/42* | (2006.01) | |
| *H04W 8/18* | (2009.01) | |
| *H04M 7/00* | (2006.01) | |
| *H04M 3/436* | (2006.01) | |
| *H04M 3/533* | (2006.01) | |
| *H04W 80/04* | (2009.01) | |

(52) U.S. Cl.
CPC ......... *H04M 3/42161* (2013.01); *H04W 8/18* (2013.01); *H04M 3/436* (2013.01); *H04M 3/53308* (2013.01); *H04M 7/0033* (2013.01); *H04M 7/0048* (2013.01); *H04M 2203/2011* (2013.01); *H04M 2203/651* (2013.01); *H04M 2207/18* (2013.01); *H04W 80/04* (2013.01)

(58) Field of Classification Search
CPC .. H04L 29/08108; H04W 4/02; H04W 4/001; H04W 8/245; H04W 88/22; H04M 7/128; H04M 1/72519; H04M 2207/18; H04M 1/72522; H04M 1/72525
USPC .................... 455/414.1, 550.1, 418; 370/329
See application file for complete search history.

(56) References Cited

U.S. PATENT DOCUMENTS

| | | | | |
|---|---|---|---|---|
| 7,738,426 B2 * | 6/2010 | Smith | .................. | H04W 88/16 370/331 |
| 7,792,275 B2 * | 9/2010 | Tai | .................... | H04M 3/42068 379/201.02 |
| 8,054,780 B1 * | 11/2011 | Manroa | .................. | H04W 4/12 370/328 |
| 8,396,445 B2 * | 3/2013 | Crawford | ................ | H04W 4/90 455/404.1 |
| 8,594,642 B2 * | 11/2013 | Silver | ..................... | H04W 4/02 455/417 |
| 8,638,782 B2 * | 1/2014 | Song | ................. | H04M 3/42008 370/331 |
| 9,513,867 B1 * | 12/2016 | Tokunaga | ............... | G06F 3/165 |
| 2003/0193967 A1 * | 10/2003 | Fenton | .................... | H04L 29/06 370/490 |
| 2007/0097975 A1 * | 5/2007 | Rakers | ............... | G06Q 30/0241 370/392 |

(Continued)

*Primary Examiner* — Danh C Le
(74) *Attorney, Agent, or Firm* — Lee & Hayes, P.C.

(57) ABSTRACT

A wireless communication network provides various services to its subscribers. Techniques and architecture described herein allow subscribers to the wireless communication network to configure various services related to handling of telephone calls to the subscribers. Such techniques allow for a user to define preferences related to third parties that call the user and how the user wishes for such calls from the third party to be handled by the wireless communication network.

20 Claims, 4 Drawing Sheets

(56) References Cited

U.S. PATENT DOCUMENTS

| | | | |
|---|---|---|---|
| 2007/0253407 A1* | 11/2007 | Wang | H04L 12/66 370/352 |
| 2007/0265830 A1* | 11/2007 | Sidhu | H04M 3/42382 704/9 |
| 2009/0024582 A1* | 1/2009 | Chung | H04L 51/14 |
| 2009/0147937 A1* | 6/2009 | Sullhan | H04M 3/42068 379/201.02 |
| 2010/0080361 A1* | 4/2010 | Houghton | H04M 3/307 379/87 |
| 2010/0330987 A1* | 12/2010 | Lee | H04W 8/26 455/432.1 |
| 2011/0208822 A1* | 8/2011 | Rathod | G06Q 30/02 709/206 |
| 2012/0020350 A1* | 1/2012 | Tai | H04M 7/128 370/352 |
| 2012/0046029 A1* | 2/2012 | Sylvain | H04W 4/043 455/423 |
| 2012/0050350 A1* | 3/2012 | Matsui | G09G 3/3233 345/690 |
| 2016/0255139 A1* | 9/2016 | Rathod | H04L 67/22 709/203 |
| 2016/0337311 A1* | 11/2016 | Le Rouzic | H04L 61/1511 |
| 2018/0020093 A1* | 1/2018 | Bentitou | H04M 3/4365 |
| 2018/0234541 A1* | 8/2018 | Rensburg | H04M 3/42068 |

* cited by examiner

USER CONFIGURABLE SERVICES IN A WIRELESS COMMUNICATION NETWORK

BACKGROUND

In recent years, telecommunication devices have advanced from offering simple voice calling services within wireless communication networks to providing users with many new features. Telecommunication devices now provide messaging services such as email, text messaging, and instant messaging; data services such as Internet browsing; media services such as storing and playing a library of favorite songs; location services; and many others. Thus, telecommunication devices, referred to herein as user devices or mobile devices, are often used in multiple contexts. In addition to the new features provided by the telecommunication devices, users of such telecommunication devices have greatly increased. Such an increase in users is only expected to continue and in fact, it is expected that there could be a growth rate of twenty times more users in the next few years alone.

Wireless communication networks generally provide various services related to handling of telephone calls (often referred to as value added services (VAS)) such as, for example, call forwarding, voicemail, call blocking, specific ringtones to identify calling parties, etc., to subscribers. However, such services are generally configured and controlled by the operator of the wireless communication network, e.g., there is generally only one default configuration for providing such services. This limits the functionality of the services and can limit the user experience for users (subscribers) of the wireless communication network.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
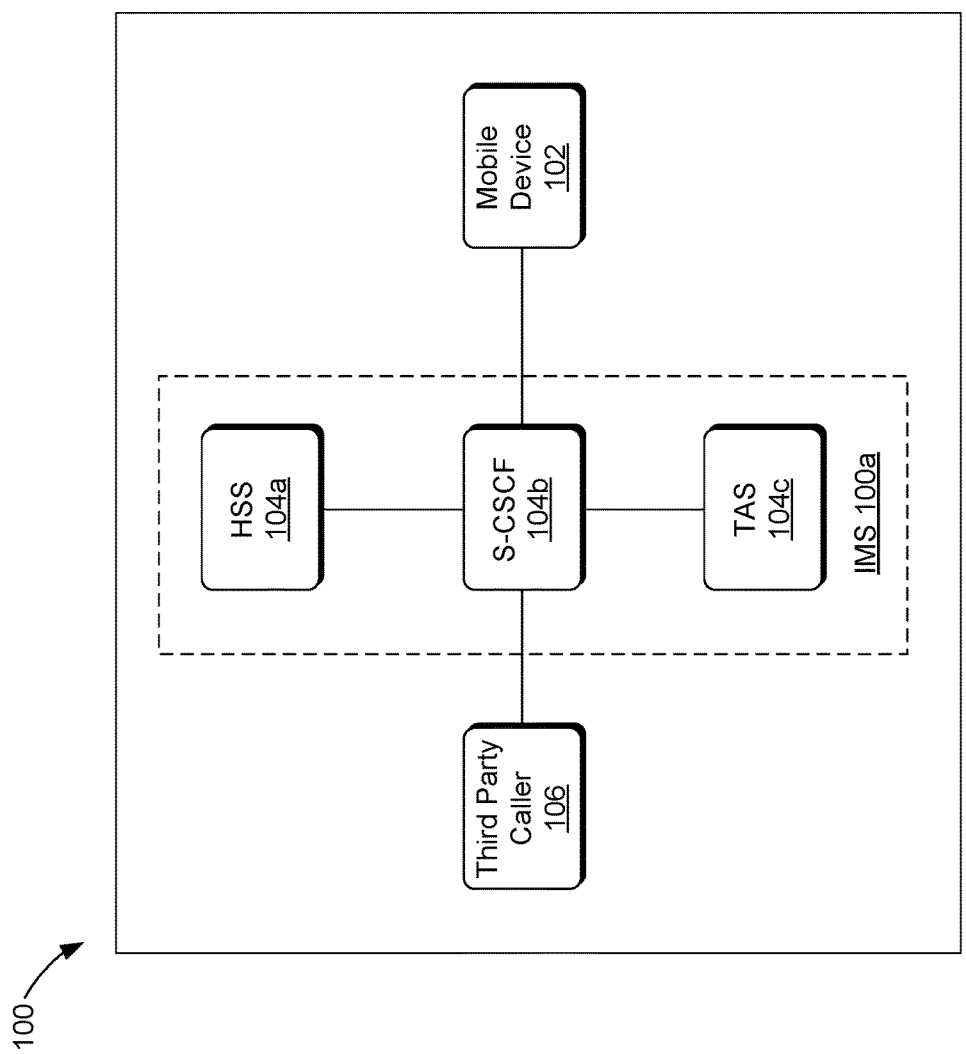
FIG. 1 schematically illustrates a wireless communication network, in accordance with various embodiments.

Described herein are techniques and architecture that allow telecommunication services subscribers of a wireless communication network to configure various services related to handling of incoming telephone calls (also referred to herein as calls) to subscribers. Such techniques allow for a telecommunication services subscriber (also referred to herein as a user) to customize a service profile that defines and customizes preferences related to third parties that call the telecommunication services subscriber and how the telecommunication services subscriber wishes for such calls from third parties to be handled by the wireless communication network.

In embodiments, after a telecommunication services subscriber subscribes to a wireless communication network for service, the telecommunication services subscriber may customize a service profile that defines a customized service profile that includes customized preferences for configuring various services related to how the wireless communication network handles incoming calls from third parties to the telecommunication services subscriber. The preferences may be updated and changed when the telecommunication services subscriber wishes. Such services may include, for example, voicemail, blocking of calls, call forwarding, specific ringtones, etc. Generally, the preferences may be customized and defined based upon an identity of the calling party, e.g., the customized service profile may include different preferences for handling incoming calls from different calling parties. Additionally, the preferences may be defined based upon a time of day that a call from a third party is received.

More particularly, the telecommunication services subscriber may define preferences such that when caller A calls the telecommunication services subscriber, a first ringtone is activated on a mobile device of the telecommunication services subscriber that is receiving the telephone call. The telecommunication services subscriber may also define that if caller A calls between 8 and 5, the phone call is automatically forwarded to voicemail. For example, if caller A is the spouse of the telecommunication services subscriber, the telecommunication services subscriber may specify that between 8 and 5, the telephone call is automatically forwarded to voicemail of the telecommunication services subscriber and a particular message may be specified by the telecommunication services subscriber for the spouse. For example, the message may say "I am busy at work and will call you as soon as possible." If caller A is a friend or a coworker, then the telephone call may be forwarded automatically to voicemail but a different message may be provided to caller A. Thus, the telecommunication services subscriber may define personalized outgoing messages for voicemail that depend on the identity of the calling party or a category of the calling party, e.g., friend, family, relative, coworker, etc. At other times of the day, e.g., not between 8 and 5, then the telecommunication services subscriber may specify to use default settings, e.g., have the mobile device ring as with a general ringtone provided to the telecommunication services subscriber (or with specific ringtones that identify callers to the telecommunication services subscriber), and if the telecommunication services subscriber does not answer the telephone call, then forward the call to voicemail.

In another example, the telecommunication services subscriber may configure the services such that when caller A calls the telecommunication services subscriber, then the mobile device of the telecommunication services subscriber may automatically send a short message (SMS) back to caller A. The message may include information related to a location telecommunication services subscriber such as "I am at location X; please come and join me."

Other examples may include a combination of the various services. For example, if caller A is a spouse and calls between 8 and 5, a specific ringtone may be provided to the mobile device of the telecommunication services subscriber where the ringtone identifies the caller as the spouse. If the telecommunication services subscriber is busy at work, then the telecommunication services subscriber may ignore or specifically reject the call and then the call is placed into voicemail. The spouse may hear a message that is specific to the spouse. In another example, if a caller is a customer or client of the telecommunication services subscriber, then the mobile device of the telecommunication services subscriber may ring with a specific ringtone that identifies the caller as a customer or client of the telecommunication services subscriber. If the telecommunication services subscriber is unable to take the call or needs to specifically reject the call, the call may be automatically forwarded, based upon the configured preferences of the telecommunication services subscriber in the customized service profile, to another coworker of the telecommunication services subscriber in order to ensure that the call is promptly answered and handled.

FIG. 1 schematically illustrates an example of a wireless communication network 100 (also referred to herein as network 100) that may be accessed by mobile devices 102 (which may not necessarily be mobile). In embodiments, the wireless communication network 100 includes multiple nodes 104. Each node 104 may be implemented by one or more servers (not shown). In the example network 100 of FIG. 1, three nodes 104 are illustrated. Generally, as is known, a wireless communication network 100 includes more nodes 104 and thus, only three nodes 104 are shown for clarity purposes. Additionally, in the example of FIG. 1, the wireless communication network 100 includes an Internet Protocol (IP) Multimedia Subsystem (IMS) 100a.

Services provided within the wireless communication network 100 may include, for example, voice calling services (e.g. telephone calls), voicemail, call forwarding, call blocking, Internet access, messaging (e.g., short message service (SMS) messages, multi-media message service (MMS) messages, instant messaging (IM) messages, enhanced message service (EMS) messages, etc.), video services, etc. Such services are generally provided via the various nodes 104 that mobile devices 102 access, i.e. the mobile devices register with the wireless communication network 100 via a node 104. For example, since the wireless communication network 100 includes the IMS 100a, then the network 100 includes a node 104a configured as a home subscriber server (HSS), which is a master user database that supports the IMS nodes that actually handle telephone calls, e.g., S-CSCF node 104b and a TAS node 104c. Generally, the HSS 104a contains the subscriber related information (Subscriber Profiles), performs authentication and authorization of the user and can provide information about the subscriber's location and IP information. The wireless communication network 100 and IMS 100a also includes the node 104b configured as a serving call session control function (S-CSCF). The S-CSCF is generally a central node of the signaling plane of the IMS 100a. The S-CSCF is generally configured as a session initiation protocol (SIP) server but also performs session control. The S-CSCF 104b interfaces to the HSS 104a to download user profiles and upload user-to-S-CSCF associations. Generally, all necessary subscriber profile information is loaded to the S-CSCF 104b from the HSS 104a. The wireless communication network 100 and IMS 100a also includes a node 104c configured as a telephone application server (TAS). The TAS 104c generally carries out functions that are not directly related to the routing of messages through the network 100. Such functions may include voice calls, voicemail, automatic call forwarding, conference bridges and many other types of applications. The nodes 104 may be implemented by one or more servers, and thus, each node may be implemented by its own server or a single server may implement multiple nodes 104. Accordingly, one or more of nodes 104a, 104b and/or 104c (as well as other nodes 104 not illustrated or described) may be implemented as a single node 104 in the wireless network 100 and/or IMS 100a.

As another example, if the wireless communication network 100 is configured as a Global System for Mobile Communications (GSM) network, then one of the nodes 104 may be a mobile switching station (MSS) server.

In an embodiment, the mobile devices 102 may comprise any appropriate devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, as well as desktop computers, devices configured as Internet of Things (IoT) devices, integrated devices combining one or more of the preceding devices, and/or the like. As such, the mobile devices 102 may range widely in terms of capabilities and features. For example, one of the mobile devices 102 may have a numeric keypad, a capability to display only a few lines of text and be configured to interoperate with only GSM networks. However, another of the mobile devices 102 (e.g., a smart phone) may have a touch-sensitive screen, a stylus, an embedded GPS receiver, and a relatively high-resolution display, and be configured to interoperate with multiple types of networks. The mobile devices may also include SIM-less devices (i.e., mobile devices that do not contain a functional subscriber identity module ("SIM")), roaming mobile devices (i.e., mobile devices operating outside of their home access networks), and/or mobile software applications.

In embodiments, the wireless communication network 100 may be configured as one of many types of networks and thus may communicate with the mobile devices 102 using one or more standards, including but not limited to GSM, Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like. In embodiments, as previously noted, the wireless communication network 100 may be include an IMS 100a and thus, may provide various services such as, for example, voice over long term evolution (VoLTE) service, video over long term evolution (ViLTE) service, rich communication services (RCS) and/or web real time communication (Web RTC).

In embodiments, a user, e.g., telecommunication services subscriber, subscribes with an operator of the wireless communication network 100 for service from the wireless communication network 100. After the user has subscribed for service from the wireless communication network 100, the user may use their mobile device 102 to configure and customize a service profile for various services provided by the wireless communication network, e.g., define preferences for handling of incoming calls, on the HSS 104a. Service logic for handling of incoming telephone calls to be received by a mobile device 102 of the user is configured on the TAS 104*c*. In embodiments, a separate server may be provided instead of the TAS 104*c* within the wireless communication network 100 for configuring and handling of the service logic for handling of telephone calls.

When a third party 106 calls the user, the incoming call is received at the S-CSCF 104*b*. If the S-CSCF 104*b* determines that the user has indeed configured a service profile for a specific handling of incoming calls from third parties, then the service logic is invoked in the TAS 104*c*. Generally, this is handled by the S-CSCF 104*b* downloading the service profile from the HSS 104*a*. The S-CSCF 104*b* uses the service logic provided by the TAS 104*c* to determine what action to take when handling the incoming telephone call. The handling of the telephone call may be based upon a schedule specified by the user when configuring their service profile. The actions that may be taken may include notifications to play specific ringtones, forwarding of the call, redirecting the call to voicemail, providing a SMS message to the calling party, blocking the call, etc.

More particularly, after a user subscribes to the wireless communication network 100 for service, the user may create and customize a service profile that defines preferences for configuring various services related to how the wireless communication network 100 handles calls from third parties to the user. The preferences may be updated and changed whenever the user wishes. Such services may include, for example, voicemail, blocking of calls, call forwarding, specific ringtones, etc. Generally, the preferences are defined based upon an identity of a third party. Additionally, the preferences may be defined based upon a schedule, e.g., a time of day that a call from a third party is received. In embodiments, the user may simply elect to create a service profile that defines a default service profile that uses default settings of the wireless communication network 100 for handling of incoming telephone calls as default preferences.

In embodiments, the user may define preferences such that when the third party 106 calls the user, a first ringtone is activated on a mobile device of the user that is receiving the telephone call. The user may also define that if the third party 106 calls between 8 and 5, the phone call is automatically forwarded to voicemail. For example, if the third party 106 is the spouse of the user, the user may specify that between 8 and 5, the telephone call is automatically forwarded to voicemail of the user and a particular message may be specified by the user for the spouse. For example, the message may say "I am busy at work and will call you as soon as possible. I love you dear." If the third party 106 is a friend or a coworker, then the telephone call may be automatically forwarded to voicemail but a different message may be provided to the third party 106. Thus, the user may define personalized outgoing messages for voicemail that depend on the identity of the third party 106 or a category of the third party 106, e.g., friend, family, relative, coworker, etc. At other times of the day, e.g., not between 8 and 5, then the user may specify to use default settings, e.g., have the mobile device 102 ring with a general ringtone provided to the user or with specific ringtones that identify callers to the user, and if the user does not answer the telephone call, then forward the call to voicemail as usual.

In embodiments, the user may configure the services such that when the third party 106 calls the user, then the mobile device 102 of the user may automatically send a short message (SMS) back to the third party 106. The message may include information related to a location telecommunication services subscriber such as "I am at location X; please come and join me."

Other examples may include a combination of the various services. For example, if the third party 106 is a spouse and calls between 8 and 5, a specific ringtone may be provided to the mobile device 102 of the user where the ringtone identifies the caller as the spouse. If the user is busy at work, then the user may ignore or specifically reject the call and then the call is forwarded to voicemail. The spouse may hear a message that is specific to the spouse. In another example, if the third party 106 is a customer or client of the user, then the mobile device 102 of the user may ring with a specific ringtone that identifies the caller as a customer or client of the user. If the user is unable to take the call or needs to specifically reject the call, the call may be automatically forwarded, based upon the configured user preferences, to another coworker of the user in order to ensure that the call is promptly answered and handled. In embodiments, if the third party 106 cannot be identified by the S-CSCF, the call may be automatically blocked, forwarded to voicemail or allowed through depending upon the preferences of the user.

Figure 2:
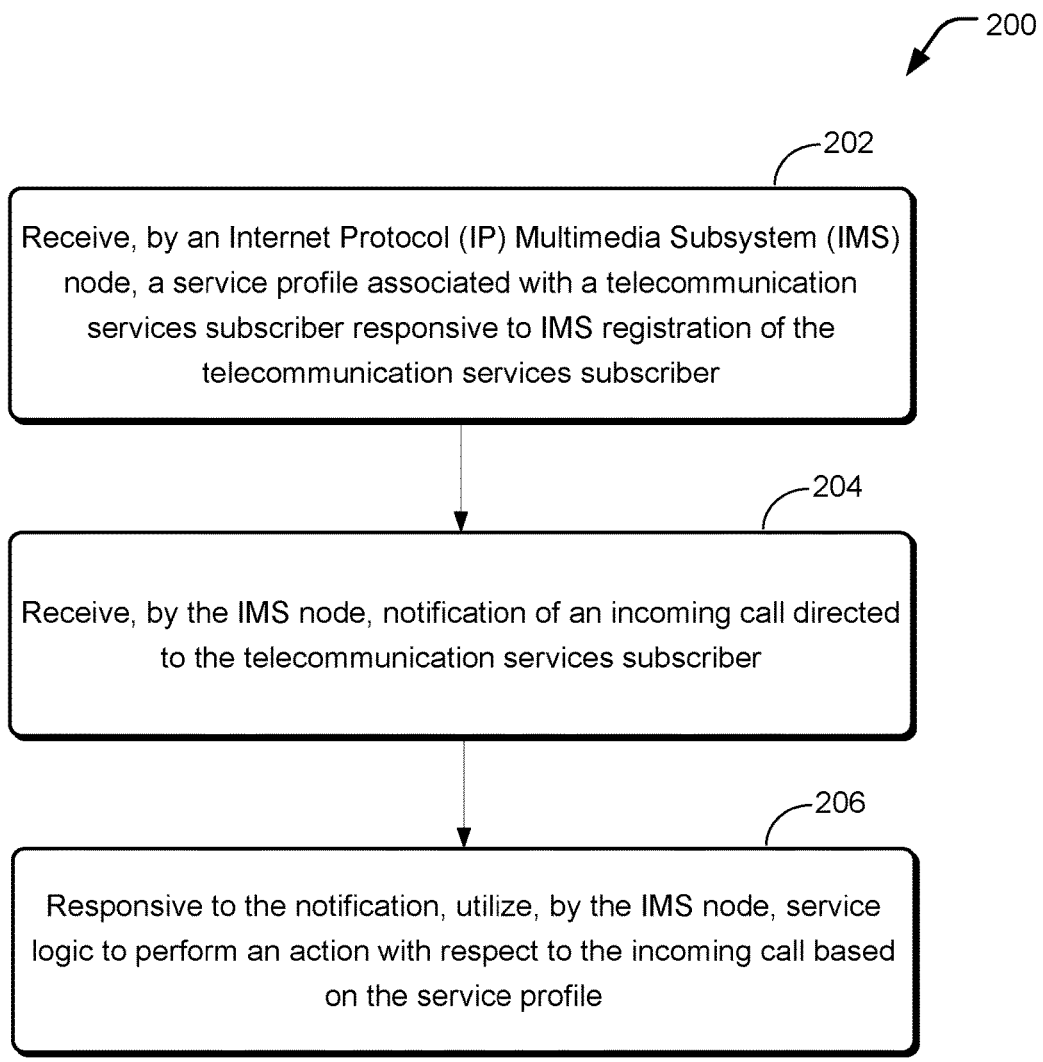
FIG. 2 is a flowchart illustrating an example method of customized a service profile that defines user preferences for handling of telephone calls in the wireless communication network of FIG. 1, in accordance with various embodiments.

FIG. 2 is a flowchart illustrating an example method 200 of customized a service profile that defines user preferences for handling of incoming telephone calls in a wireless communication network, e.g., wireless communication network 100 and IMS 100*a* of FIG. 1. As illustrated, at block 202, a service profile associated with a telecommunication services subscriber responsive to Internet Protocol (IP) Multimedia Subsystem (IMS) registration of the telecommunication services subscriber is received by an IMS node. The service profile includes preferences for handling incoming calls directed to the telecommunication services subscriber. At block 204, a notification of an incoming call directed to the telecommunication services subscriber is received by the IMS node. At block 206, responsive to the notification, service logic is utilized by the IMS node to perform an action with respect to the incoming call based on the service profile.

Figure 3:
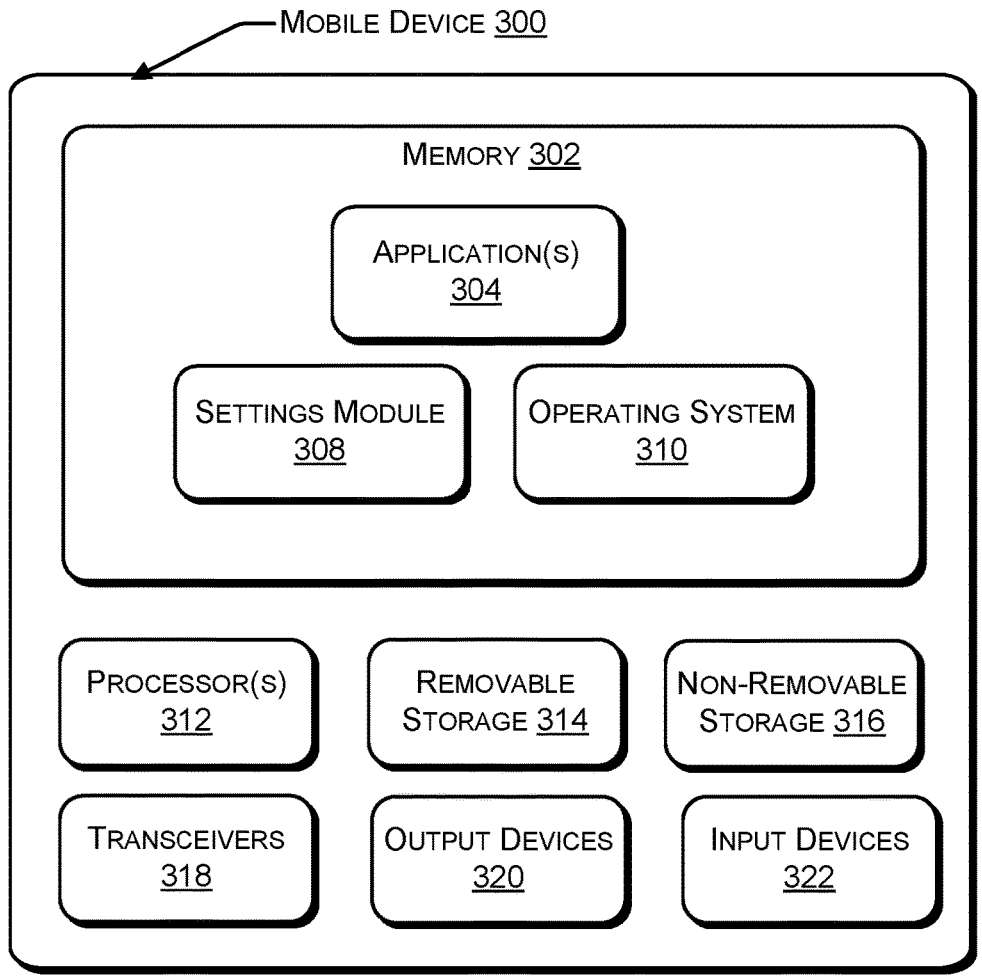
FIG. 3 illustrates a component level view of an example mobile device configured for use in the wireless communication network of FIG. 1.

FIG. 3 schematically illustrates a component level view of a mobile device 300, such as mobile device 102, configured to function within wireless communication network 100. As illustrated, the mobile device 300 comprises a system memory 302 storing application(s) 304, a settings module 308, and an operating system 310. Also, the mobile device 300 includes processor(s) 312, a removable storage 314, a non-removable storage 316, transceivers 318, output device(s) 320, and input device(s) 322. In various implementations, system memory 302 is volatile (such as RAM), non-volatile (such as ROM, flash memory, etc.) or some combination of the two. In some implementations, the processor(s) 312 is a central processing unit (CPU), a graphics processing unit (GPU), or both CPU and GPU, or any other sort of processing unit.

The mobile device 300 may also include additional data storage devices (removable and/or non-removable) such as, for example, magnetic disks, optical disks, or tape. Such additional data storage may include removable storage 314 and non-removable storage 316.

Non-transitory computer-readable media may include volatile and nonvolatile, removable and non-removable tangible, physical media implemented in technology for storage of information, such as computer readable instructions, data structures, program modules, or other data. System memory 302, removable storage 314 and non-removable storage 316 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the user device 300. Any such non-transitory computer-readable media may be part of the user device 300. The processor(s) 312 may be configured to execute instructions, which may be stored in the non-transitory computer-readable media or in other computer-readable media accessible to the processor(s) 312.

In some implementations, the transceivers 318 include any sort of transceivers known in the art. For example, the transceivers 318 may include a radio transceiver that performs the function of transmitting and receiving radio frequency communications via an antenna. Also or instead, the transceivers 318 may include wireless modem(s) to may facilitate wireless connectivity with other computing devices. Further, the transceivers 318 may include wired communication components, such as an Ethernet port, for communicating with other networked devices.

In some implementations, the output devices 320 include any sort of output devices known in the art, such as a display (e.g., a liquid crystal display), speakers, a vibrating mechanism, or a tactile feedback mechanism. Output devices 320 also include ports for one or more peripheral devices, such as headphones, peripheral speakers, or a peripheral display.

In various implementations, input devices 322 include any sort of input devices known in the art. For example, input devices 322 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 322 may be used to enter preferences of a user of the mobile device 300 to define how the user wishes certain calls from third parties to be handled by the wireless communication network, as previously described herein.

Figure 4:
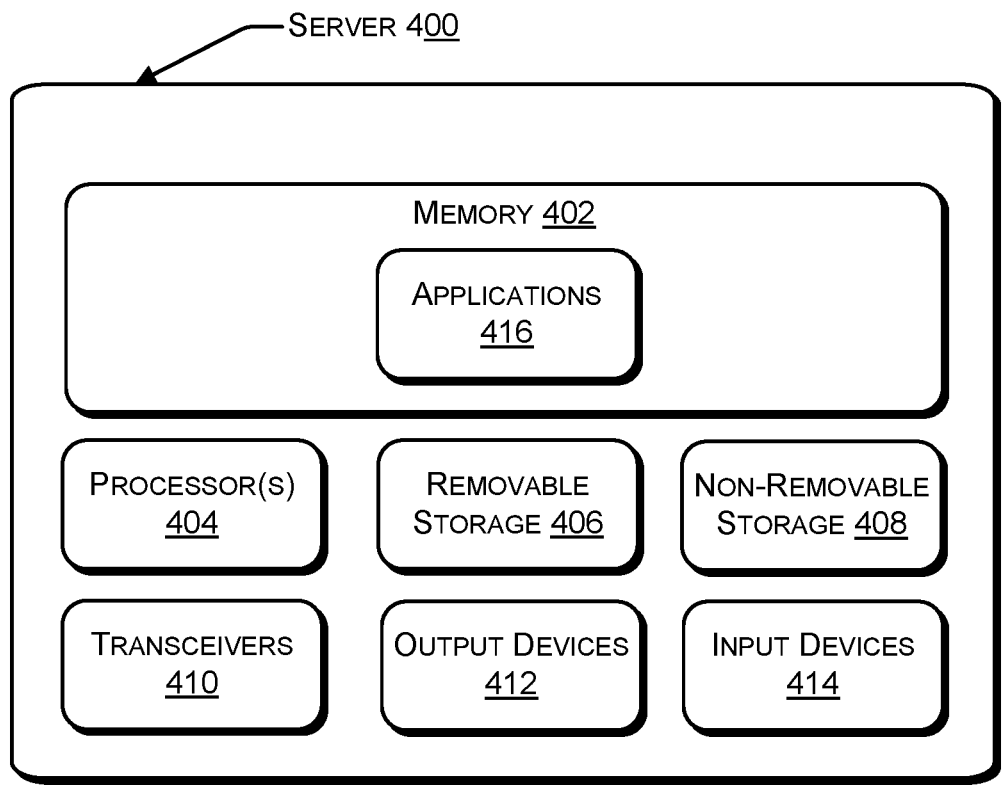
FIG. 4 illustrates a component level view of a server configured for use in the arrangement of FIG. 1 to provide various services of the wireless communication network of FIG. 1.

FIG. 4 schematically illustrates a component level view of a server, e.g., a server configured for use as a node 104 for use within a wireless communication network, e.g., wireless communication network 100 and/or IMS 100a, in order to provide various services within the wireless communication network, according to the techniques described herein. As illustrated, the server 400 comprises a system memory 402. Also, the server 400 includes processor(s) 404, a removable storage 406, a non-removable storage 408, transceivers 410, output device(s) 412, and input device(s) 414.

In various implementations, system memory 402 is volatile (such as RAM), non-volatile (such as ROM, flash memory, etc.) or some combination of the two. In some implementations, the processor(s) 404 is a central processing unit (CPU), a graphics processing unit (GPU), or both CPU and GPU, or any other sort of processing unit. System memory 402 may also include applications 416 that allow the server to perform various functions. For example, the applications 416 may allow the server 400 to perform functions associated with one or more of a HSS node 104a, a S-CSCF node 104b and/or a TAS node 104c.

The server 400 may also include additional data storage devices (removable and/or non-removable) such as, for example, magnetic disks, optical disks, or tape. Such additional storage is illustrated in FIG. 4 by removable storage 406 and non-removable storage 408.

Non-transitory computer-readable media may include volatile and nonvolatile, removable and non-removable tangible, physical media implemented in technology for storage of information, such as computer readable instructions, data structures, program modules, or other data. System memory 402, removable storage 406 and non-removable storage 408 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the server 400. Any such non-transitory computer-readable media may be part of the server 400.

In some implementations, the transceivers 410 include any sort of transceivers known in the art. For example, the transceivers 410 may include wired communication components, such as an Ethernet port, for communicating with other networked devices. Also or instead, the transceivers 410 may include wireless modem(s) to may facilitate wireless connectivity with other computing devices. Further, the transceivers 410 may include a radio transceiver that performs the function of transmitting and receiving radio frequency communications via an antenna.

In some implementations, the output devices 412 include any sort of output devices known in the art, such as a display (e.g., a liquid crystal display), speakers, a vibrating mechanism, or a tactile feedback mechanism. Output devices 412 also include ports for one or more peripheral devices, such as headphones, peripheral speakers, or a peripheral display.

In various implementations, input devices 414 include any sort of input devices known in the art. For example, input devices 414 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
  receiving, by an Internet Protocol (IP) Multimedia Subsystem (IMS) node, a service profile associated with a telecommunication services subscriber responsive to IMS registration of the telecommunication services subscriber, the service profile including a preference for handling incoming calls received during a predetermined time of day and directed to the telecommunication services subscriber from a predetermined calling party;
  receiving, by the IMS node, notification of an incoming call received during the predetermined time of day and directed to the telecommunication services subscriber from the predetermined calling party; and
  responsive to the notification, utilizing, by the IMS node, service logic to perform an action with respect to the incoming call based on the preference, wherein the action comprises sending a short message service (SMS) to the predetermined calling party associated with the incoming call and blocking the incoming call.

2. The method of claim 1, wherein the service profile includes different preferences for handling incoming calls from different calling parties.

3. The method of claim 1, wherein the action further comprises one or more of (i) forwarding the incoming call to voicemail, (ii) providing a notification to activate a particular ringtone on a mobile device of the telecommunication services subscriber, or (iii) forwarding the incoming call to another mobile device.

4. The method of claim 1, wherein sending the SMS message comprises sending an SMS message that includes a location of the telecommunication services subscriber.

5. The method of claim 1, wherein the service profile comprises additional preferences for handling calls directed to the telecommunication services subscriber corresponding to one or more of (i) a time of day, (ii) an identity of a calling party associated with the incoming call, or (iii) a relationship of the calling party to the telecommunication services subscriber.

6. The method of claim 1, wherein the service profile is based on a default service profile and the preference is based on a default preference.

7. The method of claim 1, wherein the service profile is a customized service profile and the preference is a customized preference, and the method further comprises enabling the telecommunication services subscriber to customize at least one of the service profile or the preference.

8. A wireless communication network comprising an Internet Protocol (IP) Multimedia Subsystem (IMS) and a plurality of servers comprising a non-transitory storage medium and instructions stored in the non-transitory storage medium, the instructions being executable by one or more of the plurality of servers to:
receive, by an IMS node, a service profile associated with a telecommunication services subscriber responsive to IMS registration of the telecommunication services subscriber, the service profile including a preference for handling incoming calls received during a predetermined time of day and directed to the telecommunication services subscriber from a predetermined calling party;
receive, by the IMS node, notification of an incoming call received during a predetermined time of day and directed to the telecommunication services subscriber from the predetermined calling party; and
responsive to the notification, utilize, by the IMS node, service logic to perform an action with respect to the incoming call based on the preference,
wherein the action comprises sending a short message service (SMS) to the predetermined calling party associated with the incoming call and blocking the incoming call.

9. The wireless communication network of claim 8, wherein the service profile includes different preferences for handling incoming calls from different calling parties.

10. The wireless communication network of claim 9, wherein the service profile is a customized service profile and preference is a customized preference, and the instructions are further executable by the one or more of the plurality of servers to enable the telecommunication services subscriber to customize at least one of the service profile or the preference.

11. The wireless communication network of claim 9, wherein the action further comprises one or more of (i) forwarding the incoming call to voicemail, (ii) activating a particular ringtone on a mobile device of the telecommunication services subscriber, or (iii) forwarding the incoming call to another mobile device.

12. The wireless communication network of claim 8, wherein the SMS message includes a location of the telecommunication services subscriber.

13. The wireless communication network of claim 9, wherein the service profile includes additional preferences comprising one or more of (i) a time of day, (ii) an identity of a calling party, or (iii) a relationship of the calling party to the telecommunication services subscriber.

14. The wireless communication network of claim 9, wherein the service profile is based on a default service profile and the preference is based on a default preference.

15. A non-transitory storage medium comprising instructions stored thereon, the instructions being executable by the one or more processors to:
receive, by an Internet Protocol (IP) Multimedia Subsystem (IMS) node of a wireless communication network, a service profile associated with a telecommunication services subscriber responsive to IMS registration of the telecommunication services subscriber, the service profile including a preference for handling incoming calls received during a predetermined time of day and directed to the telecommunication services subscriber from a predetermined calling party;
receive, by the IMS node, notification of an incoming call received during the predetermined time of day and directed to the telecommunication services subscriber from the predetermined calling party; and
responsive to the notification, utilize, by the IMS node, service logic to perform an action with respect to the incoming call based on the preference,
wherein the action comprises one or more of sending a short message service (SMS) to the predetermined calling party associated with the incoming call or blocking the incoming call.

16. The non-transitory storage medium of claim 15, wherein the service profile includes different preferences for handling incoming calls from different calling parties.

17. The non-transitory storage medium of claim 15, wherein the action further comprises one or more of (i) forwarding the incoming call to voicemail, (ii) activating a particular ringtone on a mobile device of the telecommunication services subscriber, or (iii) forwarding the incoming call to another mobile device.

18. The non-transitory storage medium of claim 15, wherein the service profile further comprises additional preferences comprising one or more of (i) a time of day, (ii) an identity of a calling party, or (iii) a relationship of the calling party to the telecommunication services subscriber.

19. The non-transitory storage medium of claim 15, wherein the service profile is based on a default service profile and the preference is based on a default preference.

20. The non-transitory storage medium of claim 15, wherein the service profile is a customized service profile and the preference is a customized preference, and the instructions are further executable by the one or more processors to enable the telecommunication services subscriber to customize at least one of the service profile or the preference.

* * * * *